US011178133B2

(12) United States Patent
Troia (10) Patent No.: US 11,178,133 B2
(45) Date of Patent: Nov. 16, 2021

(54) SECURE VEHICLE CONTROL UNIT UPDATE (71) Applicant: Micron Technology, Inc., Boise, ID (US)

(72) Inventor: Alberto Troia, Munich (DE)

(73) Assignee: Micron Technology, Inc., Boise, ID (US)

( * ) Notice: Subject to any disclaimer, the term of this patent is extended or adjusted under 35 U.S.C. 154(b) by 780 days.

(21) Appl. No.: 15/847,373

(22) Filed: Dec. 19, 2017

(65) Prior Publication Data

US 2019/0187291 A1 Jun. 20, 2019

(51) Int. Cl.
*H04L 29/06* (2006.01)
*G06F 21/57* (2013.01)

(52) U.S. Cl.
CPC .......... *H04L 63/083* (2013.01); *G06F 21/575* (2013.01); *H04L 63/0428* (2013.01)

(58) Field of Classification Search
CPC . H04L 63/083; H04L 63/0428; G06F 21/575; G06F 21/572
See application file for complete search history.

(56) References Cited

U.S. PATENT DOCUMENTS

| 7,899,610 B2 | 3/2011 | McClellan |
| 8,126,642 B2 | 2/2012 | Trepagnier et al. |
| 9,331,989 B2 | 5/2016 | Dover |
| 9,569,622 B2 | 2/2017 | Dover |
| 9,613,214 B2 | 4/2017 | Dover |
| 2002/0194476 A1 | 12/2002 | Lewis et al. |
| 2015/0121071 A1 | 4/2015 | Schwarz et al. |
| 2015/0121457 A1 | 4/2015 | Schwarz et al. |
| 2017/0060559 A1 | 3/2017 | Ye et al. |
| 2017/0111177 A1 | 4/2017 | Oguma et al. |
| 2017/0195459 A1 | 7/2017 | E Costa et al. |
| 2017/0214744 A1 | 7/2017 | Neves et al. |
| 2017/0346542 A1 | 11/2017 | Neves et al. |
| 2017/0358204 A1 | 12/2017 | Modica et al. |

(Continued)

FOREIGN PATENT DOCUMENTS

| WO | 2011-053357 A1 | 5/2011 |
| WO | 2016-117907 A1 | 7/2016 |

OTHER PUBLICATIONS

International Search Report and Written Opinion from related international application No. PCT/US2018/065113, dated Apr. 12, 2019, 15 pp.

*Primary Examiner* — Jeffrey D. Popham
(74) *Attorney, Agent, or Firm* — Brooks, Cameron & Huebsch, PLLC (57) ABSTRACT

The present disclosure includes apparatuses and methods related to a secure vehicle control unit update. An example apparatus comprises a processing resource coupled to a memory resource. The memory resource can be configured to store a private key associated with a vehicle and store data corresponding to an update to a control unit of the vehicle. The processing resource can be configured to compare the private key associated with the vehicle and a private key included in the data corresponding to the update to the control unit that is stored in the memory resource and allow transmission of the update to the control unit of the vehicle in response to the private key associated with the vehicle matching the private key included in the data.

23 Claims, 4 Drawing Sheets

(56) References Cited

U.S. PATENT DOCUMENTS

2018/0014198 A1 1/2018 Suh et al.
2018/0212967 A1* 7/2018 Chen ................. H04W 12/0609
2018/0300472 A1* 10/2018 Nakamura ............. G06F 21/45

* cited by examiner

SECURE VEHICLE CONTROL UNIT UPDATE

TECHNICAL FIELD

The present disclosure relates generally to semiconductor memory and methods, and more particularly, to apparatuses and methods related to a secure vehicle control unit update.

BACKGROUND

In conventional motor vehicles (e.g., automobiles, cars, trucks, buses, etc.), the driver is critical to operating the vehicle's control system. For example, the driver of a conventional motor vehicle makes decisions regarding the safe operation of the vehicle. Such decisions may include decisions related to the speed of the vehicle, steering of the vehicle, obstacle and/or hazard recognition, and obstacle and/or hazard avoidance. However, a driver's ability to make these decisions and operate the vehicle's control system may be limited in some situations. For example, driver impairment, fatigue, attentiveness, and/or other factors such as visibility (e.g., due to weather or changes in terrain) may limit a driver's ability to safely operate a conventional motor vehicle and/or its control system. Also, the firmware and software that a vehicle's control system (e.g. control unit) may be updated. The updates can be associated with improving the performance of the vehicle.

In order to alleviate the deficiencies resulting from driver operation of a conventional motor vehicle, various manufacturers have experimented with autonomous vehicles. While autonomous vehicles may allow for a reduction in issues that may arise as a result of the driver's ability to operate the conventional motor vehicle becoming lessened, autonomous vehicles have their own shortcomings.

For example, vehicles, including autonomous vehicles, may rely on various control components (e.g., control circuits), sensors, and/or cameras to determine a speed at which to operate the vehicle, steering of the vehicle, obstacle and/or hazard recognition, and obstacle and/or hazard avoidance. Such control components, sensors and/or cameras may fail and/or may require additional information (e.g., updates) to safely operate the vehicle from a host computing device responsible for providing updates to the autonomous vehicle. If the control components, sensors, and/or cameras fail or do not receive adequate or properly configured information to continue to operate the vehicle, the vehicle may cease to operate or, in worse case scenarios, fail to provide adequate obstacle and/or hazard recognition, and obstacle and/or hazard avoidance, which may result in injury or death to passengers in the vehicle.

DETAILED DESCRIPTION

The present disclosure includes apparatuses and methods related to a secure vehicle control unit update. An example apparatus comprises a processing resource coupled to a memory resource. The memory resource can be configured to store a private key associated with a vehicle and store data corresponding to an update to a control unit of the vehicle. The processing resource can be configured to compare the private key associated with the vehicle and a private key included in the data corresponding to the update to the control unit that is stored in the memory resource and allow transmission of the update to the control unit of the vehicle in response to the private key associated with the vehicle matching the private key included in the data. For example, the private key included in the data corresponding to the update to the control unit that is stored in the memory resource can be included in a secure message with a message signature that is generated using a message authentication communication (MAC). The private key associated with the vehicle can be stored in a memory resource of the apparatus and included in a signature generated by the processing resource for comparison to the private key included in the data corresponding to the update to the control unit that is stored in the memory resource.

In some embodiments, the secure message may include one or more authentication protocols, which may include one or more anti-replay mechanisms. An anti-replay mechanism may include information to indicate a "freshness" of the secure message (e.g., to indicate that the message was generated at or within a particular time period) and/or the additional fields may include one or more anti-replay protocols to alleviate the risk of a man-in-the-middle attack, for example. Non-limiting examples of anti-replay mechanisms may include a timestamp (e.g., a secure timestamp) that may be generated and included as part of the anti-replay mechanism, a cryptographic nonce, which may be a random or pseudo-random value that is generated for one time use and included as part of the anti-replay protocol, and/or a count value that may be included as part of the anti-replay mechanism. In some embodiments, the count value may be a numerical value associated with a counter that is monotonically incremented based on various criteria such as the vehicle being powered on, a vehicle part being installed in the vehicle, etc.

A vehicle may be under the control of the vehicle manufacturer during production. The vehicle manufacturer may provide an initial configuration of the vehicle and/or vehicle components during or directly after production, but prior to the vehicle reaching an end user. However, after the vehicle is no longer under the control of the manufacturer (e.g., once the vehicle has been shipped, purchased, etc.) the manufacturer may no longer have any control over the configuration of the vehicle.

Updates to a control unit of the vehicle can be communicated from a host computing device (e.g., a computer at a service shop) to the vehicle via an on board diagnostics (ODB) II port. Due to the manufacturer's lack of control over the vehicle once it leaves their possession, an end user (e.g., a purchaser of a vehicle) and/or vehicle service center (e.g., mechanic) may potentially install updates to the control unit of the vehicle that are not properly configured and may result in harmful operation of the vehicle. This may be further exacerbated in autonomous vehicle deployments in which multiple functions of a vehicle may be controlled via control circuitry (e.g., hardware) and/or artificial intelligence components, because the update to the control unit of the vehicle may not be properly configured, which may result in failure of the vehicle and, in extreme case, injury or death to the vehicle operator. As used herein, an "autonomous vehicle" is a vehicle such as a car, truck, bus, motorcycle, moped, all-terrain vehicle, military vehicle, tank, etc. in which at least a portion of the decision-making and/or control over vehicle operations is controlled by computer hardware and/or software, as opposed to a human operator.

In some approaches, autonomous vehicles may include one or more artificial intelligence components. These components may be configured to perceive the surrounding environment and take actions to maximize a chance of success of completing a particular goal. In autonomous vehicles, the particular goal may be operating the autonomous vehicle safely. For example, the goal may be to operate the autonomous vehicle at a safe speed, safely control steering of the autonomous vehicle, and/or providing obstacle and/or hazard recognition, and/or obstacle and/or hazard avoidance.

In some approaches, the control circuitry of a control unit in vehicle may be utilized to update firmware and/or control unit parameters associated with one or more vehicle parts and/or control circuitries. For example, in some approaches, the control circuitry of the vehicle may be configured to transfer information such as configuration and/or configuration profile information between the control circuitry and a control module associated with a particular function of a vehicle. However, in some approaches, the control unit of a vehicle can receive updates that can harm a vehicle by causing the vehicle to operate in an unsafe manner or operate such that components of the vehicle are harmed, even to the point of the vehicle becoming inoperable. As used herein, a "configuration profile" is a set of instructions or semantics that manages the functionality of control circuitry, host computing devices, vehicle parts, etc. In some embodiments, a configuration profile may be firmware, for example.

For example, because operation of the control system in a vehicle may be wholly or partly handled by control circuitry, vehicles may be susceptible to corrupt updates to a control unit from third parties. In some approaches, updates to a vehicle's control circuitry (e.g., firmware updates, control unit parameter updates, vehicle object recognition updates, etc.), for example, may be susceptible to man-in-the-middle attacks in which a nefarious actor secretly replays, alters communications, and/or sends corrupt updates between the vehicle and a host computing device responsible for providing updates to the control unit of the vehicle. This may lead to unsafe situations in which a malicious entity may gain control over all or a portion of operation of the vehicle.

In contrast, embodiments disclosed herein may allow for secure delivery and implementation of control unit updates between the vehicle and host computing device. The data corresponding to the updates may provide updates to the firmware of the vehicle control unit and/or vehicle parts, vehicle part configuration data, trained data sets for operation of the autonomous vehicle's neural network, control unit parameter updates, data collected by the autonomous vehicle such as data corresponding to objects that are unrecognizable to the autonomous vehicle, and the like.

The figures herein follow a numbering convention in which the first digit or digits correspond to the drawing figure number and the remaining digits identify an element or component in the drawing. Similar elements or components between different figures may be identified by the use of similar digits. For example, 101 may reference element "02" in FIG. 1, and a similar element may be referenced as 202 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Figure 1:
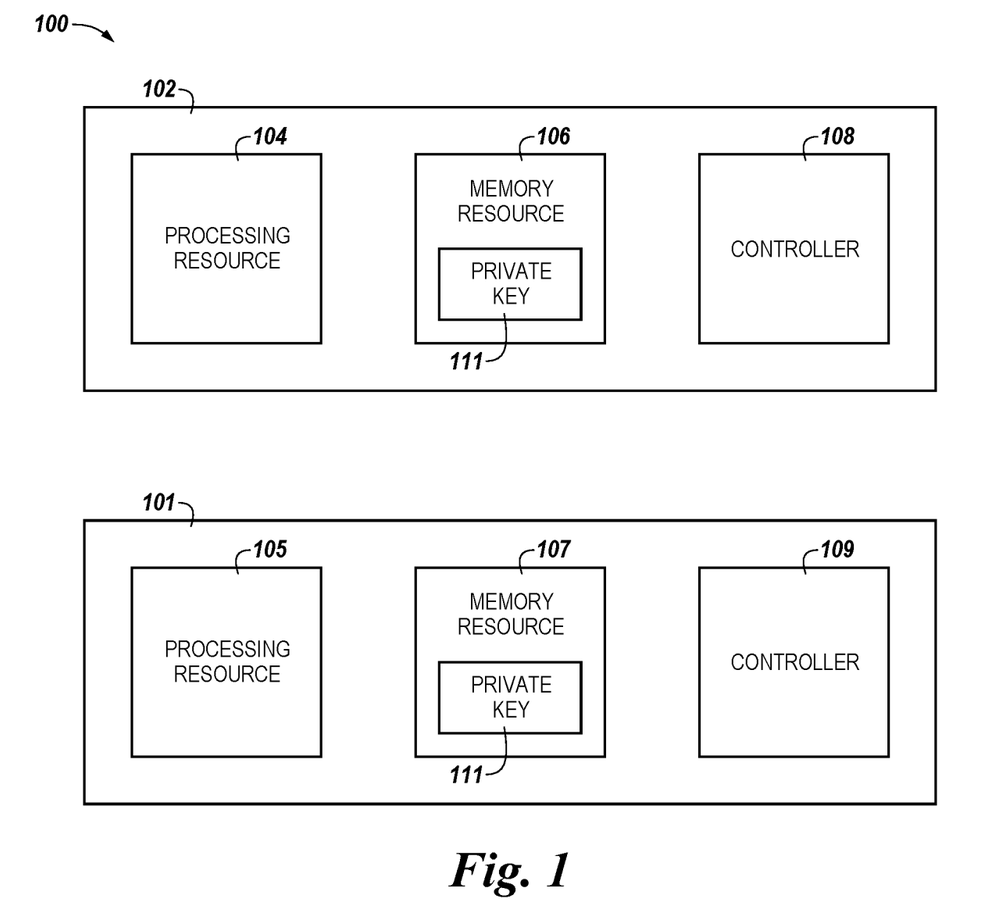
FIG. 1 is a block diagram of an apparatus in the form of a firewall and an apparatus in the form of a control unit in accordance with a number of embodiments of the present disclosure.

FIG. 1 is a block diagram of an apparatus 100 in the form of a firewall 102 and control unit 101 in accordance with a number of embodiments of the present disclosure. As used herein, firewall 102, a control unit 101, processing resource 105, memory resource 107, controller 109, and/or neural network 110 might also be separately considered an "apparatus."

As shown in FIG. 1, apparatus 100 includes a firewall 102, which includes processing resource 104, memory resource 106, and controller 108. The processing resource 104 may be a central processing unit (CPU), semiconductor based microprocessor, integrated circuit based microprocessor, vector processor, and/or other hardware device(s) suitable for retrieval and execution of instructions stored in the memory resource 106. Firewall 102 may be coupled to an on board diagnostics (OBD) II port of a vehicle and received commands, requests, and or data associated with control unit 101.

The memory resource 106 may include volatile and/or non-volatile memory configured to store instructions executable by the processing resource 104. For example, the memory resource 106 may include flash memory, read-only memory (ROM), programmable read-only memory (PROM), erasable programmable read-only memory (EPROM), electrically erasable programmable read-only memory (EEPROM), dynamic random-access memory (DRAM), static random-access memory (SRAM), and/or other suitable storage media.

Memory resource 106 can be configured to store data corresponding to an update for control unit 102 and/or a private key 111 associated with a vehicle. The private key 111 may be based, at least in part, on a vehicle identification number (VIN) associated with the vehicle. The private key may be based, at least in part, on a VIN, but may not have any information (e.g., numbers and/or digits) in common with the VIN. In general, each vehicle manufactured has a unique VIN assigned thereto when the vehicle is being manufactured. The VIN may be used to identify a vehicle, among other things.

As discussed above, the private key 111 can be based, at least in part, on the VIN. For example, the private key 111 can be generated such that it is associated with the VIN to facilitate identification of a particular vehicle. Similar to the VIN, the private key may be unique to the vehicle to which it is assigned. In some embodiments, the private key 111 can be stored in the memory resource 106 when the vehicle is manufactured. Embodiments are not so limited; however, and the private key may be stored in a memory device coupled to the firewall 102.

The private key 111 may be read; however, the private key 111 may not be modified. As a result, the integrity of the private key 111 can preserved. In some embodiments, the private key 111 may not be transferred from the vehicle (e.g., the private key 111 may not be transferred across a bus providing a signal path from the control unit to other circuitry in the vehicle and/or a host computing device).

In some embodiments, the private key 111 may be used to ensure that changes made to the control unit of the vehicle that are unauthorized are not allowed. For example, the processing resource 105 can compare the private key 111 stored in memory resource 107 to a private key included in data associated with updates to the control unit of the vehicle in order to prevent the use of unauthorized vehicle modification, such as aftermarket tuning. If the private key 111 stored in memory resource 107 matches the private key included in data associated with updates to the control unit of the vehicle, the update is sent from the firewall 101 to the control unit 102 and is executed by the control unit 102. If the private key 111 stored in memory resource 107 does not match the private key included in data associated with updates to the control unit of the vehicle, the update is not sent from the firewall 101 to the control unit 102 and the update is not executed by the control unit 102.

The controller 108 can be configured to control operation of the firewall 102. In some embodiments, the controller 108 can decode signals received to the firewall 102 that are used to control operation of the firewall 102 and control unit 101. The controller 108 can be a state machine, sequencer, or some other type of controller, and can include hardware and/or firmware (e.g., microcode instructions) in the form of an application specific integrated circuit (ASIC), field programmable gate array, etc. In some embodiments, the controller 108 can control generation and decoding of secure messages transmitted between the control unit 101, firewall 102, and a host computing device (e.g., host computing device 203 illustrated in FIG. 2).

As shown in FIG. 1, apparatus 100 includes a control unit 101 (e.g., a vehicle electronic control unit), which includes processing resource 104, memory resource 107, and controller 109. The processing resource may be a central processing unit (CPU), semiconductor based microprocessor, integrated circuit based microprocessor, vector processor, and/or other hardware device(s) suitable for retrieval and execution of instructions stored in the memory resource 107.

The memory resource 107 may include volatile and/or non-volatile memory configured to store instructions executable by the processing resource 104. For example, the memory resource 107 may include flash memory, read-only memory (ROM), programmable read-only memory (PROM), erasable programmable read-only memory (EPROM), electrically erasable programmable read-only memory (EEPROM), dynamic random-access memory (DRAM), static random-access memory (SRAM), and/or other suitable storage media.

Figure 2:
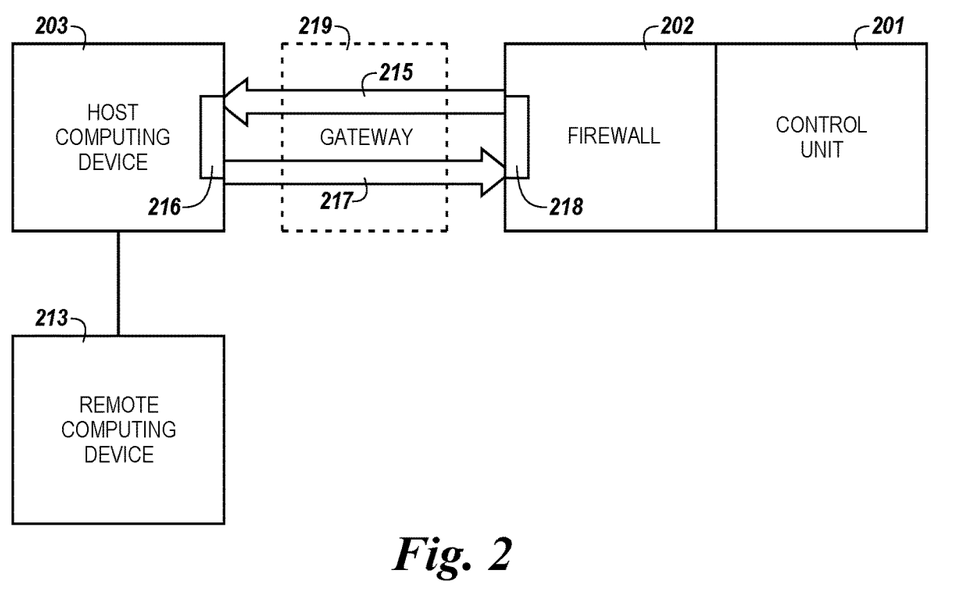
FIG. 2 is a block diagram of a system including a host computing device, a remote computing device, a firewall, and a control unit in accordance with a number of embodiments of the present disclosure.

Control unit 201 may correspond to various electronic control units utilized by the vehicle. For example, control unit 201 may include an engine control component, a vehicle control component, a powertrain control component, an electronic brake control component, a body control components, and/or combinations thereof. These components may be responsible for performing and/or coordinating performance of various vehicle tasks such as operating the vehicle, steering the vehicle, controlling braking of the vehicle, etc.

An engine control component may include hardware and/or instructions configure to control actuators of the engine of the vehicle. For example, the engine control component may control ignition timing, air-to-fuel ratios, etc. of the vehicle. The vehicle control component may include hardware and/or software configured to control engine and/or vehicle performance.

The powertrain control component may include hardware and/or software to control the powertrain of the vehicle. The electronic brake control component may include hardware and/or software to control and/or read data corresponding to the braking system of the vehicle, and the body control component may include hardware and/or software configured to control body features of the vehicle such as power windows, power seats, etc.

The memory resource 107 may store a private key 111 associated with a vehicle. The private key 111 may be based, at least in part, on a vehicle identification number (VIN) associated with the vehicle. In general, each vehicle manufactured has a unique VIN assigned thereto when the vehicle is being manufactured. The VIN may be used to identify a vehicle, among other things.

As discussed above, the private key 111 can be based, at least in part, on the VIN. For example, the private key 111 can be generated such that it is associated with the VIN to facilitate identification of a particular vehicle. Similar to the VIN, the private key may be unique to the vehicle to which it is assigned. In some embodiments, the private key 111 can be stored in the memory resource 107 when the vehicle is manufactured. Embodiments are not so limited; however, and the private key may be stored in a memory device coupled to the control unit 101.

The private key 111 may be read; however, the private key 111 may not be modified. As a result, the integrity of the private key 111 can preserved. In some embodiments, the private key 111 may not be transferred from the vehicle (e.g., the private key 111 may not be transferred across a bus providing a signal path from the control unit to other circuitry in the vehicle and/or a host computing device).

The controller 109 can be configured to control operation of the control unit 101. In some embodiments, the controller 109 can decode signals received to the control unit 101 that are used to control operation of the control unit 101. The controller 109 can be a state machine, sequencer, or some other type of controller, and can include hardware and/or firmware (e.g., microcode instructions) in the form of an application specific integrated circuit (ASIC), field programmable gate array, etc. In some embodiments, the controller 109 can control generation and decoding of secure messages transmitted between the control unit 101 and a host computing device (e.g., host computing device 203 illustrated in FIG. 2).

FIG. 2 is a block diagram of a system including a host computing device 203, remote computing device 213, firewall 202, and control unit 201 in accordance with a number of embodiments of the present disclosure. As shown in FIG. 2, the control unit 201, firewall 202, and the host computing device 203 may be configured to exchange communications via communication paths 215 and 217. In some embodiments, communication path 215 may be utilized to transfer communications from the control unit 201 to the host computing device 203 via firewall 202, and communication path 217 may be utilized to transfer communications from the host computing device 203 to the control unit 201 via firewall 202. Communication paths 215 and/or 217 may represent paths over which wired and/or wireless communications between the control unit 201, firewall 202, and the host computing device 203 may be transferred.

In order to facilitate communication between the control unit 201 and the host computing device 203, various communication protocols may be used. For example, various on board diagnostic protocols (e.g., OBD-II protocols) such as SAE J1850 PWM or SAE J1850 VPM may be used to facilitate communication between the control unit 201 and the host computing device 203. Examples are not so limited; however, and the communication protocol between the control unit 201 and the host computing device 203 may include protocols such as ISO 9141-2, ISO 14230 KPW2000, ISO 15765 CAN, Ethernet, local area network, FlexRay, etc. Host computing device 203 can include a port 216 (e.g., an OBD II port) and firewall 202 can include port 218 (e.g., an OBD II port), wherein the host computing device 203 and firewall 202 can send communications between ports 216 and 218 on communication paths 215 and/or 217.

In some embodiments, the system may include a gateway 219. As used herein, the gateway 219 may be a network gateway configured to interface between devices that use different protocols. For example, a protocol used by the control unit 201 and firewall 202 may be different than a protocol used by the host computing device 203, and the gateway 219 may be configured to facilitate communication between the control unit 201, firewall 202, and the host computing device 203. In some embodiments, the gateway 219 includes hardware configured to convert between the protocols used by the control unit 201, firewall 202, and the host computing device 203. For example, gateway 219 can calculate signatures for secure messages using a protocol (e.g., a MAC protocol) that are based on a private key.

The gateway 219 may be configured as an internet gateway, cloud gateway, internet of things gateway, server, or other suitable gateway for facilitating communication between the control unit 201, firewall 202, and the host computing device 203. In some embodiments, the gateway may be disposed in the vehicle or the gateway may be disposed in or near the host computing device 203 (e.g., the gateway may be remote to the vehicle).

The host computing device 203 and the remote computing device 213 may include hardware configured to perform particular tasks (e.g., a physical computing device, server, etc.), and/or the host computing device 203 and the remote computing device 213 may be deployed as part of a software defined data center (e.g., as a virtualized computing device). In some embodiments, the host computing device 203 and the remote computing device 213 may be located in a geophysically different locations from each other and the control unit 201 and firewall 202, which may be disposed in an vehicle as described in more detail in connection with FIG. 3, herein. The remote computing device 213 may be maintained by the manufacturer of the autonomous vehicle and host computing device 203 may be maintained by a vehicle service provider (e.g., a mechanics shop). For example, the remote computing device 213 may be under the control of the manufacturer of the vehicle and/or the manufacturer of a vehicle part and the host computing device 203 may be under the control of a certified service provider associated with the manufacturer of the vehicle. The host computing device 203 can be coupled to the remote computing device 213 has part of a wired and/or wireless network, including a gateway, such as gateway 219.

In some embodiments, the host computing device 203 can send a request to update the control unit 201 to the firewall 202 via port 216, communication path 217, and port 218. The firewall 202 can recognize the request as a request to write data to the control unit 201 and, in response, send a vehicle identification number (VIN) for the vehicle to the host computing device 203 via port 218, communication path 215, and port 216. The host computing device 203 can send the VIN along with a request for data associated with the update to control unit 201 to the remote computing device 213. The remote computing device 213 can send data corresponding to the update, along with a private key associated with the VIN, back to the host computing device 203. The host computing device 203 can send the data corresponding to the update to the firewall 202. The firewall 202 can store the data corresponding to the update to a memory resource on the firewall 202. The firewall can compare the private key included in the data corresponding to the update to the control unit to a private key stored in the firewall. If the private key included in the data corresponding to the update to the control unit matches the private key stored in the firewall, the update is authorized by the firewall and the data corresponding to the update is sent to the control unit.

In some embodiments, data corresponding to the update to the control unit including the private key can sent as a secure message. The secure message can be decrypted by the firewall 202.

In some embodiments, the host computing device 203 can send a request to obtain data from the control unit 201 to the firewall 202 via port 216, communication path 217, and port 218. The firewall 202 can recognize the request as a request to read data from the control unit 201. The firewall 202 can, in response, send the request to control unit 201 and the control unit 201 can send requested data to the host computing device 203. The requested data can be sent without the firewall authorizing the request based on matching private keys.

The private key stored in the memory resource of firewall 202 can be included in a secure key generated by the processing resource of the firewall 202. The secure key can include a signature that includes the private key stored in the memory resource of firewall 202.

The host processing device 203, the remote processing device, firewall 202, and control unit 201 can communicate via secure messages. For example, the update for the control unit can be included in a secure message that is sent from the remote computing device 213 to the host computing device 203 and in a secure message that is sent from the host computing device 203 to the firewall 202. The secure messages can include a header. The header may include supplemental data placed at the beginning of the secure message. The header may include control information to provide for delivering the secure message, for example.

The secure messages may include a typology identification. The typology identification may include classification information associated with a particular control unit, an update to the control unit, a control component, a host computing device, etc. For example, the typology identification may include information corresponding to a manufacturer, make, and/or model of the control unit, update to the control unit, control component, host computing device, etc.

The secure messages may include a vehicle identification number (VIN) associated with the vehicle. The VIN may be used to identify the particular vehicle associated with the secure message. In some embodiments, the VIN may be concatenated with (e.g., on top of) the typology identification.

The secure messages may further include the serial number. The serial number may be a serial number of a particular control unit, update to the control unit, control component, host computing device, etc. In some embodiments, the serial number may provide specific identification information regarding the particular control unit, update to the control unit, control component, host computing device, etc. The serial number may be concatenated with (e.g., on top of) the VIN and/or typology identification.

The secure messages may further include a private key. The private key can be generated and included in a signature such that it is associated with the VIN to facilitate identification of a particular vehicle. Similar to the VIN, the private key may be unique to the vehicle to which it is assigned. The private key may be concatenated with (e.g., on top of) the serial number, VIN and/or typology identification.

The secure messages may further include a counter value. The counter value may correspond to a value generated by a counter, as described above. In some embodiments, the counter may be a monotonic counter. The counter may be incremented in response to a power cycle of the vehicle, update to the control unit, host computing device, control unit(s), control component(s), or combinations thereof. The counter value may be concatenated with (e.g., on top of) the private key, the serial number, VIN and/or typology identification.

The secure messages may further include a payload. The payload 536 may include a message to be exchanged between the host computing device, vehicle part, control component, and/or control unit(s). For example, the payload may include data for an update to the control unit of the vehicle.

In some embodiments, the secure communication may further include an authentication protocol. In some embodiments, the authentication protocol may comprise an anti-replay authentication protocol. The authentication protocol may be provided to alleviate the risk of man-in-the-middle or other malicious packet injection attacks. In some embodiments, the authentication protocol may be uniquely generated each time the host computing device generates the secure message.

In some embodiments, the authentication protocol may include additional fields. For example, the authentication protocol may include a timestamp indicating when the secure message was generated or transmitted. In some embodiments, the authentication protocol may include a random value (e.g., a cryptographic nonce). In some embodiments, the authentication protocol may include a count value that is incremented (e.g., monotonically) as each secure message is generated.

In some embodiments, the secure messages may further include a message authentication code (MAC). The MAC may be generated by the host computing device, remote computing device, vehicle, vehicle part, control unit(s), control component(s), and/or host computing device, etc. from the vehicle may comprise information to authenticate the secure message and/or to alleviate the risk of a man-in-the-middle attack and to guarantee the system against the anti-replay attack. In some embodiments, the MAC based on a secret key it may be a hash-based message authentication code (HMAC). In some embodiments, the MAC may be based on the private key, and may comprise a HMAC. The MAC may be generated by the host computing device, remote computing device, and/or control unit. In some embodiments, the MAC may be generated based on the private key.

The secure messages may further include footer. In some embodiments, the footer may include information related to handling the secure message, and/or the footer may include information signifying the end of the secure message. In some embodiments, the footer may include information concerning the destination of the secure message.

Figure 3:
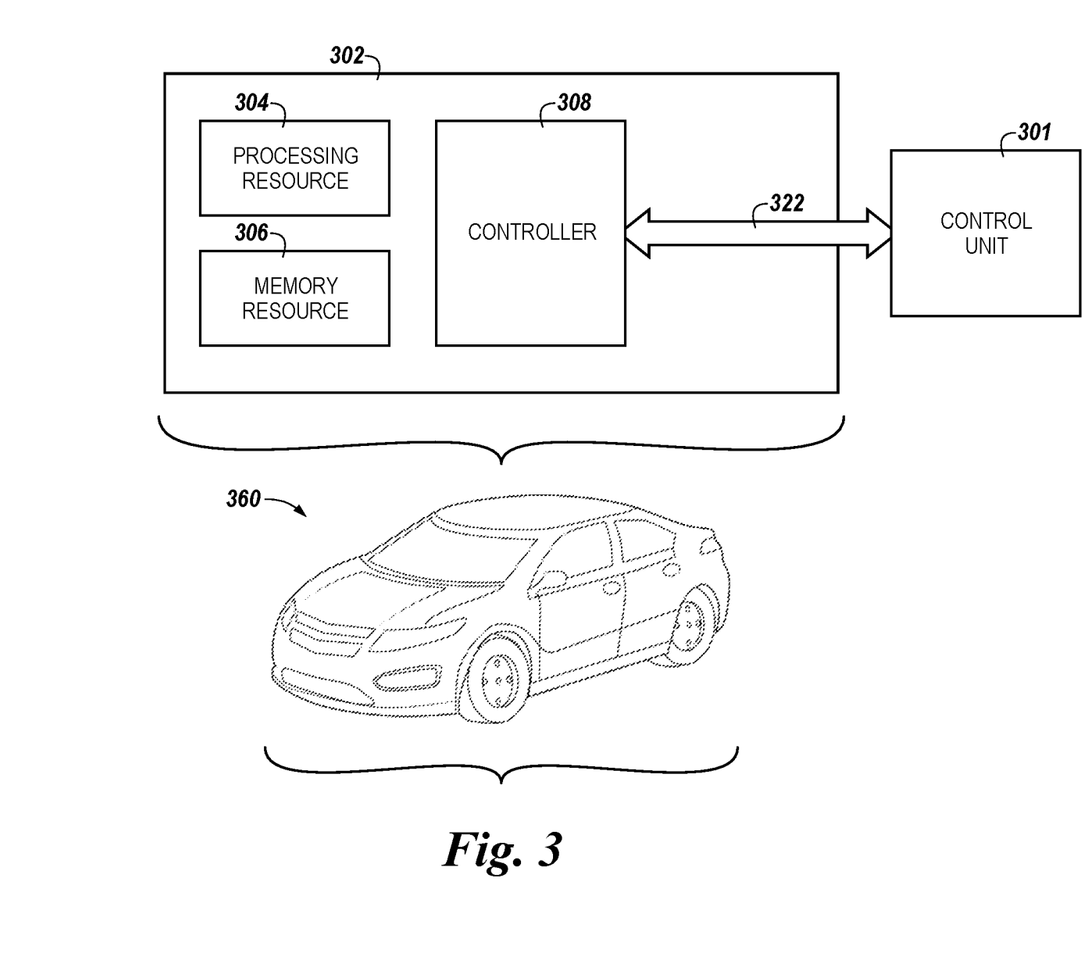
FIG. 3 is a block diagram of vehicle including a firewall and a control unit in accordance with a number of embodiments of the present disclosure.

FIG. 3 is a diagram of a system in the form of a vehicle 360 in accordance with a number of embodiments of the present disclosure. As shown in FIG. 3, the vehicle 360 may include control unit 301 and firewall 302. As shown in FIG. 3, the firewall 302 includes a processing resource 304, memory resource 306, and controller 308.

The firewall 302 is configured to communicate with the control unit 301 via communication path 322. Communication path 322 may be used to transmit communications from the control unit 301 to the firewall 302 as well as from the firewall 302 to the control unit 301.

The firewall can include a processing resource 304 and memory resource 306. Memory resource 306 can store a private key associated with vehicle 360 and also data corresponding to the update to the control unit that was sent to the firewall from a host computing device. The processing resource 304 can compare the private key included in the data corresponding to the update to the control unit to the private key stored in the memory resource 306. If the private key included in the data corresponding to the update to the control unit matches the private key stored in the memory resource 306, the controller 308 authorizes the update and sends the data corresponding to the update to the control unit 301 via communication pay 322.

Figure 4:
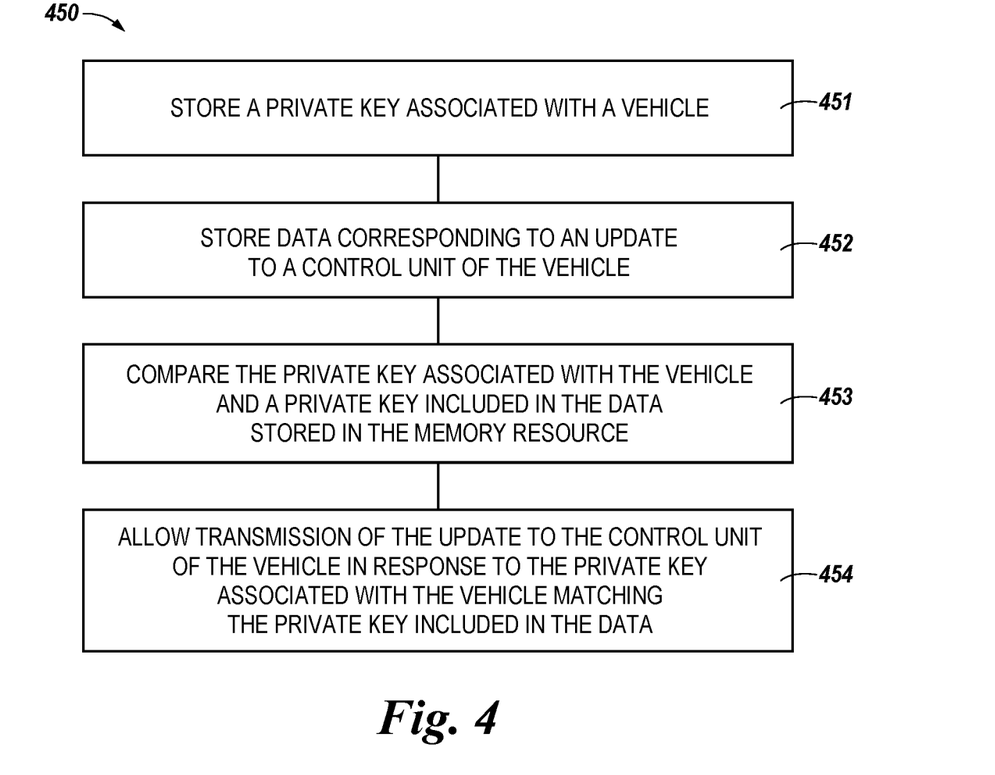
FIG. 4 is a flow diagram in accordance with a number of embodiments of the present disclosure.

FIG. 4 is a flow diagram 450 in accordance with a number of embodiments of the present disclosure. In some embodiments, the flow diagram 450 may represent performance of a method. At block 451, storing a private key associated with a vehicle. In some embodiments, a firewall on a vehicle may store the private key and use the private key to authorize updates to a control unit of a vehicle.

At block 452, the method may include storing data corresponding to an update to a control unit of the vehicle. In some embodiments, the firewall may receive a request to update the control unit of the vehicle. The firewall can store the data corresponding to the update in a memory resource on the firewall while the firewall is determining whether or not to authorize updates to the control unit of the vehicle.

At block 453, the method may include comparing the private key associated with the vehicle and a private key included in the data associated with the data stored in the memory resource. The data associated with the update may include a private key. This private key included in the data associated with the update can be compared to the private key stored in a memory resource on the firewall.

At block 454, the method may include allowing transmission of the update to the control unit of the vehicle in response to the private key associated with the vehicle matching the private key included in the data. In some embodiments, when the private key included in the data associated with the update matches to the private key stored in a memory resource on the firewall, the update can be authorized by the firewall and the data associated with the update can be sent to the control unit and executed by the control unit.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a firewall located between a control unit and a host computing device, comprising:
a port configured to receive from and send to communication with the host computing device;
a controller configured to:
decode signals received to the firewall via the port and used to control operation of the firewall and a control unit of a vehicle, wherein the control unit is coupled to the controller; and
control generation and decoding of secure messages transmitted between the control unit, the firewall, and the host computing device via the port;
a memory resource configured to:
store a first private key associated with the vehicle;
receive a secure message via the port, the secure message comprising data corresponding to a firmware update to the control unit, an authentication protocol, and a message authentication code; and
store the data corresponding to a firmware update to the control unit,
wherein the data comprises a second private key, vehicle part configuration data, trained data sets, control unit parameter updates, and data collected by the vehicle; and
a processing resource coupled to the memory resource, wherein the processing resource is configured to:
generate a secure key comprising a signature that includes the first private key;
write the first private key to the memory resource;
write the data corresponding to the firmware update to the memory resource as the secure message;
decrypt the secure message;
compare the first private key associated with the vehicle and the second private key included in the data corresponding to the firmware update;
send the firmware update, via the port, to the control unit of the vehicle in response to the first private key associated with the vehicle matching the second private key included in the data corresponding to the firmware update; and
cancel sending of the firmware update to the control unit in response to the first private key associated with the vehicle not matching the second private key included in the data corresponding to the firmware update.

2. The apparatus of claim 1, wherein the first private key is generated based on a vehicle identification number assigned to the vehicle.

3. The apparatus of claim 1, wherein the memory resource is configured to receive the data corresponding to the update to a control unit of the vehicle via an on board diagnostics (OBD) II interface.

4. The apparatus of claim 1, further comprising the memory resource configured to store data corresponding to a control unit parameter update to the control unit of the vehicle.

5. The apparatus of claim 1, wherein the apparatus includes the controller configured to send, via the port, the data corresponding to the firmware update to the control unit of the vehicle in response to the first private key associated with the vehicle matching the second private key included in the data corresponding to the firmware update.

6. The apparatus of claim 1, further comprising the memory resource configured to store the data corresponding to the firmware update in response to the controller receiving a request that includes the firmware update to the control unit of the vehicle.

7. An apparatus, comprising:
a firewall located between a control unit of a vehicle and a host computing device, comprising:
a first port configured to receive from and send to communication with the host computing device;
the host computing device including a memory resource, a processing resource, and a second port configured to receive from and send to communication with the firewall,
the memory resource configured to:
store a first private key associated with the vehicle; and
store data corresponding to a firmware update to the control unit of the vehicle, wherein the data corresponding to the firmware update comprises a second private key, vehicle part configuration data, trained data sets, control unit parameter updates, and data collected by the vehicle; and
the processing resource coupled to the memory resource, wherein the processing resource is configured to:
send a request to the firewall, wherein the firewall is in communication with the host computing device and the control unit of a vehicle, to update the firmware of the control unit of the vehicle, wherein the request is sent via the first port and the second port;
receive a vehicle identification number (VIN) for the vehicle from the firewall;
send the VIN to a remote computing device coupled to the host computing device;
receive a secure message via the first and the second port, including the data corresponding to the firmware update for the control unit of the vehicle, an authentication protocol, and a message authentication code from the remote computing device; and
transmit, to the vehicle and via the firewall, the data corresponding to the firmware update for the control unit of the vehicle.

8. The apparatus of claim 7, wherein the VIN is further received by the host computing device from the vehicle via an on board diagnostics (OBD) II interface.

9. The apparatus of claim 7, wherein the host computing device is configured to send a request to the firewall, via the first port, to read data from the control unit of the vehicle and wherein the request does not include the first private key associated with the vehicle.

10. The apparatus of claim 9, further comprising the host computing device configured to receive, from the vehicle, data associated with the request to read data.

11. The apparatus of claim 7, wherein the first private key is based, at least in part, on the VIN associated with the vehicle.

12. A system, comprising:
a vehicle including a firewall and a control unit, the firewall located between the control unit and a host computing device and comprising:
a first port configured to receive from and send to communication with the host computing device;
a controller configured to decode signals received to the firewall via the first port and used to control operation of the firewall and the control unit, wherein the control unit is coupled to the controller;
the host computing device including a memory resource, a processing resource, a controller, and a second port configured to receive from and send to communication with the firewall; and
a remote computing device including a memory resource, a processing resource, and a controller,
wherein the host computing device is configured to receive a vehicle identification number (VIN) from the vehicle via the first port and the second port in response to sending a request to the firewall via the second port to update firmware of the control unit,
wherein the host computing device sends a request for data corresponding to the firmware update to the remote computing device and receives the data corresponding to the firmware update via a first secure message that includes a private key, an authentication protocol and a message authentication code from the remote computing device,
wherein the host computing device stores the data corresponding to the firmware update, wherein the data corresponding to the firmware update includes a private key, vehicle part configuration data, trained data sets, control unit parameter updates, and data collected by the vehicle, and
wherein the host computing device sends the data corresponding to the firmware update to the vehicle via the second port as a second secure message, and the firewall of the vehicle decrypts the second secure message and compares the private key included in the data corresponding to the firmware update to a private key stored in the firewall.

13. The system of claim 12, wherein the firewall of the vehicle is configured to write the data corresponding to the firmware update to a memory resource in the firewall.

14. The system of claim 12, wherein the firewall of the vehicle is configured to send the data corresponding to the firmware update to the control unit of vehicle in response to the private key included in the data corresponding to the firmware update matching the private key stored in the firewall.

15. The system of claim 12, wherein the request for data corresponding to the firmware update includes the VIN.

16. The system of claim 15, wherein the remote computing device stores the private key associated with the VIN of the vehicle and includes the private key in the data corresponding to the update at least partially based on the request for data associated with the firmware update including the VIN of the vehicle.

17. A method, comprising:
sending, from a host computing device via a first port of the host computing device configured to receive from and send to communication with a firewall, a request to the firewall in communication with the host computing device to update a firmware of a control unit of a vehicle;
sending, from the host computing device, a request for data corresponding to the update to a control unit of a vehicle to a remote computing device,
receiving, at the host computing device, data corresponding to the update to the control unit from the remote computing device, wherein the data corresponding to the update to the control unit includes a private key associated with the vehicle, vehicle part configuration data, trained data sets, control unit parameter updates, and data collected by the vehicle;
storing the private key associated with the vehicle;
sending, from the host computing device and via the first port, the data corresponding to the update as a secure message including an authentication protocol and a message authentication code to the firewall of the vehicle;
decrypting the secure message and comparing, at the firewall on the vehicle, the private key associated with the vehicle to a private key stored on the firewall; and
authorizing the update to the control unit in response to the private key associated with the vehicle matching the private key stored on the firewall.

18. The method of claim 17, further including sending the data corresponding to the update to the vehicle to the control unit of the vehicle in response to the private key associated with the vehicle matching the private key stored on the firewall.

19. The method of claim 17, further including storing the data corresponding to the update in a memory resource on the firewall.

20. The method of claim 17, further including sending a vehicle identification number (VIN) associated with the vehicle with the request for data corresponding to the update.

21. The method of claim 17, further including canceling the update to the control unit in response to the private key associated with the vehicle not matching the private key stored on the firewall.

22. The method of claim 17, further including executing the update to the control unit by updating the firmware of the control unit.

23. The method of claim 17, wherein the secure message comprises a header comprising control information to provide for delivering the secure message and a footer information signifying the end of the secure message and information concerning the destination of the secure message.

* * * * *